(12) United States Patent
Lammers

(10) Patent No.: US 9,851,227 B2
(45) Date of Patent: Dec. 26, 2017

(54) TPMS SENSOR AUTOLOCATION THROUGH LOW FREQUENCY PROGRAMMING

(71) Applicant: Shawn D. Lammers, Delta (CA)

(72) Inventor: Shawn D. Lammers, Delta (CA)

(73) Assignee: BENDIX COMMERCIAL VEHICLE SYSTEMS LLC, Elyria, OH (US)

( * ) Notice: Subject to any disclaimer, the term of this patent is extended or adjusted under 35 U.S.C. 154(b) by 370 days.

(21) Appl. No.: 14/636,488

(22) Filed: Mar. 3, 2015

(65) Prior Publication Data

US 2016/0258830 A1 Sep. 8, 2016

(51) Int. Cl.
| | |
|---|---|
| G01L 7/00 | (2006.01) |
| G01D 5/54 | (2006.01) |
| B60C 23/00 | (2006.01) |
| B60C 23/04 | (2006.01) |
| G01D 21/00 | (2006.01) |

(52) U.S. Cl.
CPC ............ *G01D 5/54* (2013.01); *B60C 23/008* (2013.01); *B60C 23/044* (2013.01); *B60C 23/0416* (2013.01); *B60C 23/0444* (2013.01); *G01D 21/00* (2013.01)

(58) Field of Classification Search
None
See application file for complete search history.

(56) References Cited

U.S. PATENT DOCUMENTS

| | | | |
|---|---|---|---|
| 6,879,252 B2* | 4/2005 | DeZorzi | B60C 23/0416 340/10.1 |
| 7,825,787 B2 | 11/2010 | Saitou et al. | |
| 7,944,348 B2 | 5/2011 | Watasue | |
| 7,994,904 B2 | 8/2011 | Kim | |
| 8,188,848 B2 | 5/2012 | Lange et al. | |
| 8,400,289 B2 | 3/2013 | Heise et al. | |
| 8,749,369 B2 | 6/2014 | Lee et al. | |
| 8,903,602 B2 | 12/2014 | Bailie et al. | |
| 2006/0259214 A1* | 11/2006 | McQuade | B60C 23/0413 340/445 |
| 2009/0066496 A1* | 3/2009 | Nantz | B60C 23/0433 340/442 |
| 2010/0274607 A1* | 10/2010 | Carresjo | B60C 23/0416 705/7.11 |
| 2011/0153264 A1* | 6/2011 | Kuchler | B60C 23/007 702/150 |
| 2013/0282225 A1 | 10/2013 | Gerardiere | |

* cited by examiner

*Primary Examiner* — Cory Eskridge
(74) *Attorney, Agent, or Firm* — Fay Sharpe LLP

(57) ABSTRACT

In order to mitigate a need for reprogramming tire pressure sensors after tire rotation, tire change, etc., all sensors on a vehicle are preprogrammed with a lookup table that correlates modulation frequency to axle and wheel end positions on the vehicle. Dual antenna initiator coils are mounted to a vehicle such that each wheel end has one directional antenna directed toward it. Each initiator coil is programmed to modulate its transmission frequency by a predetermined modulation frequency such that each antenna transmits using a different modulation frequency. Each sensor receives a modulated signal, identifies the modulation frequency, and performs a table lookup to determine its axle and wheel end location. The sensor transmits its identified wheel end and axle location to a controller unit along with tire pressure status information for its wheel.

24 Claims, 4 Drawing Sheets

TPMS SENSOR AUTOLOCATION THROUGH LOW FREQUENCY PROGRAMMING

BACKGROUND

The present application finds particular application in tire pressure monitoring sensor (TPMS) systems. However, it will be appreciated that the described techniques may also find application in other monitoring systems, other sensor systems, or other vehicle safety systems.

Configuration of conventional TPMS systems requires association of individual sensor ID codes with actual wheel positions on a vehicle. If tires are rotated or sensors are replaced, the TPMS electronic control unit (ECU) component requires reprogramming to recreate the mapping of sensor ID codes to wheel locations. This requires special tools to activate each individual sensor as well as tools to connect to the vehicle J1939 bus and place the TPMS ECU component into a learning mode.

One conventional approach relates to a wheel-identifying apparatus with a device on each axle that transmits trigger signals. Each of the devices is oriented at an angle to the other device so that only certain TPMS sensors in the path of the trigger signal will receive the signal from a respective device. Another conventional approach relates to a TPMS with a trigger module at each axle. The TPMS determines which TPMS sensors are located at which wheel end by triggering only one wheel end trigger module at a time. The accelerometers in the TPMS sensors help determine whether the sensor is on the left or right side.

The present innovation provides new and improved systems and methods that facilitate automatically identifying the location of each TPMS sensor on a multi-axle vehicle using low frequency initiator coils with multi-directional antennas to reduce programming overhead and mitigate a need for reprogramming all tire pressure sensors upon tire rotation, wheel replacement, etc., which overcome the above-referenced problems and others.

SUMMARY

In accordance with one aspect, a system that facilitates automatically identifying the location of each of a plurality of tire pressure sensor on a multi-axle vehicle comprises a plurality of low-frequency initiator coils, each having at least one directional antenna, and a plurality of tire pressure sensors, each positioned on a wheel of the vehicle. Each antenna emits a signal that is modulated at a different frequency relative to other antennas. Each sensor detects a modulation frequency received thereby, determines an axle and wheel end at which it is located as function of the detected modulation frequency, and reports its axle and wheel end to the controller unit.

In accordance with another aspect, a tire pressure sensor that automatically detects and reports its location to a controller comprises a receiver that receives a modulated frequency signal from a signal source, and a processor configured to determines a modulation frequency used to modulate the frequency signal, and further configured to determine location information describing an axle and wheel end at which the sensor is located as a function of the determined modulation frequency. The tire pressure sensor further comprises a tire pressure monitor module that monitors air pressure in a tire associated with the sensor. The processor is further configured to generate a tire pressure status message comprising tire pressure status information and the location information for transmission to a control unit.

In accordance with another aspect, a system that facilitates automatically identifying the location of each of a plurality of tire pressure sensor on a multi-axle vehicle comprises a plurality of low-frequency initiator coils, each having at least one directional antenna, and a plurality of tire pressure sensors, each positioned on a respective wheel of the vehicle. Each antenna emits a signal that is modulated at a different frequency relative to other antennas. Each sensor detects a modulation frequency received and reports the received modulation signal to a controller. The controller receives the reported modulation frequency and determines an axle and wheel end at which the sensor is located as function of the detected modulation frequency.

In accordance with another aspect, a method of automatically detecting and reporting a tire pressure sensor location to a controller comprises receiving a modulated frequency signal from a signal source, determining a modulation frequency used to modulate the received frequency signal, and determining location information describing an axle and wheel end at which the sensor is located as a function of the determined modulation frequency. The method further comprises monitoring air pressure in a tire associated with the sensor, and generating a tire pressure status message comprising tire pressure status information and the location information for transmission to a control unit.

In accordance with another aspect, an apparatus that facilitates automatically detecting and reporting a tire pressure sensor location to a controller comprises receiving means for receiving a modulated frequency signal from a signal source, and monitoring means for monitoring air pressure in a tire associated with the sensor. The apparatus further comprises processing means for determining a modulation frequency used to modulate the received frequency signal, for determining location information describing an axle and wheel end at which the sensor is located as a function of the determined modulation frequency, and for generating a tire pressure status message comprising tire pressure status information and the location information for transmission to a control unit.

One advantage is that the TPMS sensor can automatically be mapped to wheel locations.

Another advantage is that when tires are rotated or sensors replaced, no user interaction is required to make the system fully operational.

Still further advantages of the subject innovation will be appreciated by those of ordinary skill in the art upon reading and understanding the following detailed description.

BRIEF DESCRIPTION OF THE DRAWINGS

The innovation may take form in various components and arrangements of components, and in various steps and arrangements of steps. The drawings are only for purposes of illustrating various aspects and are not to be construed as limiting the invention.

DETAILED DESCRIPTION

The foregoing problems are overcome by the herein-described systems and methods, which facilitate automatically identifying the location of each TPMS sensor on a multi-axle vehicle, such as a tractor-trailer, without requiring a priori programming of each the position of each sensor into a controller or electronic control unit (ECU). The system can be set up with a plurality (e.g., one per axle) of low frequency initiator coils (transmitters). In one embodiment, one transmitter is positioned on a front axle and one transmitter is positioned on each side of a pair of rear axles. Each low frequency initiator coil is able to emit two different orthogonal frequency fields. In another example, the frequency fields can be oriented between 30 and 180 degrees from each other. (Alternatively, only one frequency per coil with more coils.) The modulation can occur using On/Off Keying (OOK), amplitude shift keying (FSK) or frequency shift keying (FSK). For example, the low frequency initiator on the right rear axle can emit a 125 kHz signal modulated at first modulation frequency (e.g., 6 Hz) at an angle that only the mid axle TPMS sensors are able to receive. The tire pressure sensors on the two tires add the first modulation frequency to their unique sensor identifier message, which is sent back to the central controller. The controller performs a table lookup and identifies the 6 Hz frequency as being associated with TPMS sensors on the mid axle on the right side of the vehicle. In another embodiment, the table lookup to identify sensor position is performed by each respective sensor, and the position information is transmitted to the controller. The low frequency initiator coils can be stand-alone devices or can be connected to the controller. Additionally or alternatively, the initiator coils can transmit constantly or only at power up of the vehicle. In one embodiment, the TPMS sensors receive a unique frequency initiation based on their location on the vehicle in order to automatically identify their location.

The initiator has at least one antenna. In one embodiment, the initiator transmits at a carrier preset frequency and that is modulated using on/off keying (OOK) at frequencies between 1 Hz and 20 Hz. IN another embodiment, each coil is programmed to transmit at a unique frequency (e.g., from 120 kHz to 130 kHz).

Figure 1:
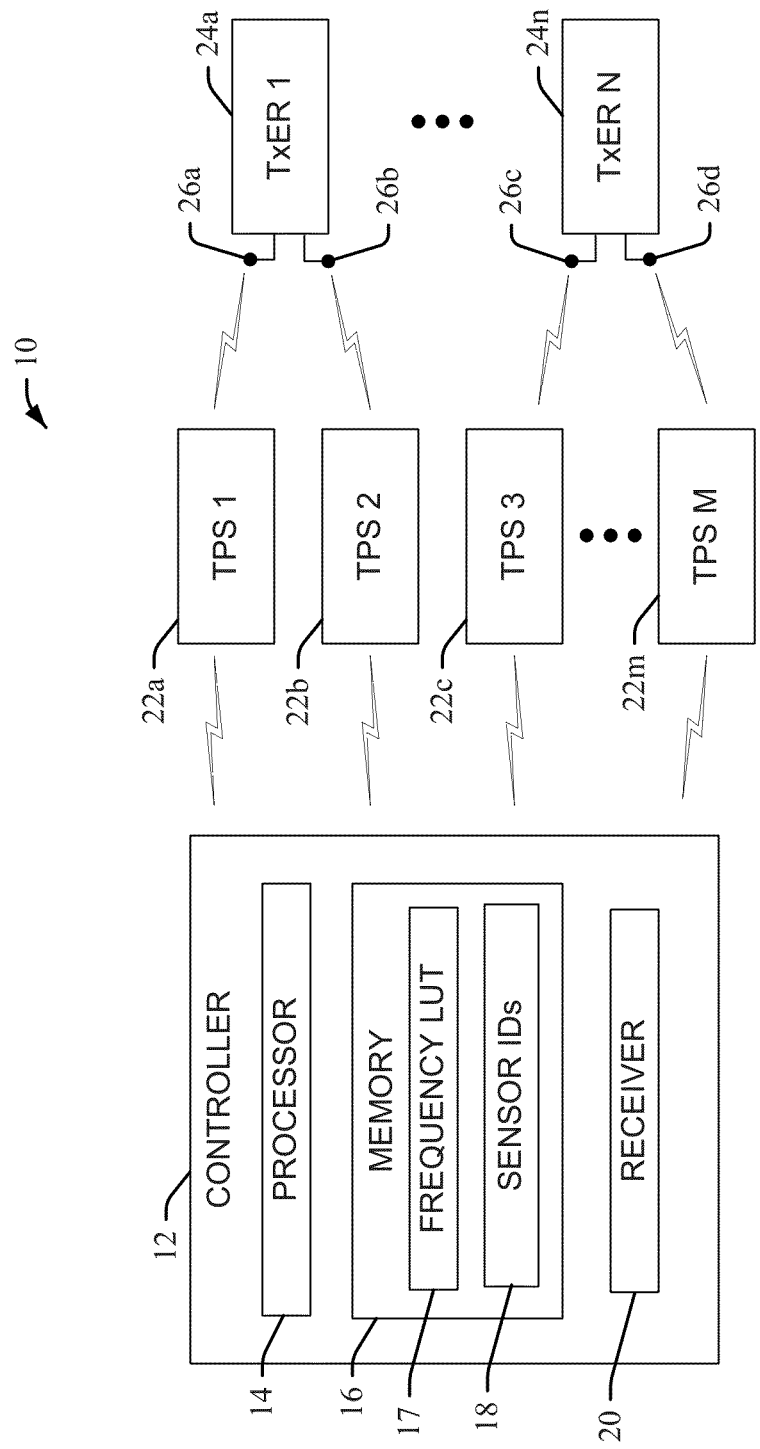
FIG. 1 illustrates a system that facilitates automatically identifying the location of each TPMS sensor on a multi-axle vehicle, in accordance with various aspects set forth herein.

FIG. 1 illustrates a system 10 that facilitates automatically and dynamically identifying the location of each TPMS sensor on a multi-axle vehicle, which mitigates a need for reprogramming tire pressure sensors with new location information upon tire rotation, wheel replacement, etc., in accordance with various aspects set forth herein. The system includes a controller unit 12 (e.g., an electronic controller unit or ECU, or the like), which comprises a processor 14 that executes, and a memory 16 that stores, computer-executable instructions (e.g., modules, routines, programs, applications, etc.) for performing the various methods, techniques protocols, etc., described herein. The memory 16 may include volatile memory, non-volatile memory, solid state memory, flash memory, random-access memory (RAM), read-only memory (ROM), programmable read-only memory (PROM), erasable programmable read-only memory (EPROM), electronic erasable programmable read-only memory (EEPROM), variants of the foregoing memory types, combinations thereof, and/or any other type(s) of memory suitable for providing the described functionality and/or storing computer-executable instructions for execution by the processor 14. Additionally, "module," as used herein denotes a set of computer-executable instructions (e.g., a routine, sub-routine, program, application, or the like) that is persistently stored on the computer-readable medium or memory for execution by the processor.

In one embodiment, the controller memory 16 includes a frequency lookup table (LUT) 17 that correlates coil transmission modulation frequencies to wheel ends. In a related embodiment, the memory stores one or more sensor IDs 18 that identify respective sensors. Additionally, the controller comprises a receiver 20 that receives signals from the respective tire pressure sensors for analysis by the processor to determine the axle and wheel end at which each respective sensor is located.

The system further includes a plurality of tire pressure sensors (TPS) including a first TPS 22a, a second TPS 22b, a third TPS 22c, and an Mth TPS 22m, wherein M is an integer. Thus, the system can comprise any number of TPSs (i.e., one for each wheel on the vehicle). Each sensor incorporates position information into its sensor ID code. In one embodiment, one portion of the sensor ID code is a random number and another portion includes position information (e.g., axle and wheel end or numbers). The controller uses the position information in addition to the sensor ID code to automatically locate the sensor data in the correct wheel position. For instance rather than performing the sensor position lookup at the controller, each respective sensor can be pre-programmed with a frequency lookup table (FIG. 3) that correlates modulation frequencies to wheel ends. The sensor then incorporates its position information into its tire pressure status message. In another embodiment, each sensor transmits only its position information, and tire pressure status information is transmitted separately.

Additionally or alternatively, each sensor can determine its position from the received modulation frequency, and can include in its tire pressure status message both its position information and the detected modulation frequency so that the controller can independently confirm that the detected modulation frequency in fact corresponds to the position reported by the sensor.

The system also includes a plurality of low-frequency initiator coils or transmitters (TxERs) including a first transmitter 24a, and an Nth transmitter 24n, wherein N is an integer. Thus, the system can comprise any number of initiator coil transmitters (e.g., one for each axle on the vehicle). In one embodiment, the initiator coils are battery powered to mitigate a need for wired connections. Each initiator coil transmitter 24 comprises a pair of directional antennas 26, wherein each antenna transmits a different frequency in a different direction relative to the other antenna frequencies and transmission directions. For instance, a first antenna 26a on the first initiator coil transmitter 24a transmits at a carrier signal and uses On/Off keying at a first modulation frequency (e.g., 2 Hz) in a first direction, and a second antenna 26b on the first transmitter 24a transmits a carrier signal modulated by a second modulation frequency (e.g., 3 Hz) in a second direction. Similarly, the first and second antennas 26c, 26d, of the Nth initiator coil transmitter 24n are arranged in respective first and second directions. In one embodiment the first and second directions of transmission for each antenna pair are orthogonal to each other (e.g., at 90°) or approximately orthogonal to each other. In another embodiment, the antenna directions are set at a predetermined angle relative to each other (e.g., 60° or the like). In yet another embodiment, the antenna directions are manually set at the time of installation of the initiator coil transmitters to transmit toward the desired wheel end(s) such that each antenna is directed toward a unique target wheel end. Alternatively, the source carrier frequency can be amplitude modulated, or the source carrier frequency can be set differently for each coil (e.g. 123 kHz, 125 kHz, 128 kHz, etc.).

In one embodiment, low cost LF initiators 24 are placed on the vehicle that each sensor can detect. For instance, each LF initiator emits a 125 Khz modulated LF field, modulated at a different frequency (e.g., 2 Hz, 5 Hz, a frequency in the rage of 1 Hz to 20 Hz, or some other suitable low modulation frequency, etc.) for each antenna on each sensor. The frequency of the modulation corresponds to a particular axle/wheel combination. During system operation, when a TPMS sensor detects and measures the LF modulation frequency it receives from a respective LF initiator, the sensor is automatically programmed with the position information for subsequent transmission. In another embodiment, each sensor transmits only the detected LF modulation frequency information, with or without tire pressure status information, and the controller performs a table lookup to determine the location of the sensor based on the reported modulation frequency.

In another embodiment, the LF coil is power cycled at predetermined intervals, and the timing of the transmissions is used to determine sensor wheel end and axle location via a lookup table. According to another example, LF initiator coil signals from each antenna are transmitted with varied power levels, and power level information is used to identify sensor location via a table lookup. In yet another embodiment, the programmer programs the initiator coil (or other signal source) to transmit a digital signal that is correlated to a specific wheel end and axle.

To limit the number of LF initiation coils used to permit system function, each coil emits two LF fields oriented, e.g., 90 degrees apart from each other. Each field has a different modulation frequency to enable use on two axles or wheel ends, such that the LF coils transmit across an axle instead of point to wheel ends on different axles. Therefore, for instance, three LF modules can support 10 tire locations on a three axle vehicle. Each coil also generates LF fields modulated at a specific frequency that the tire pressure sensors in the wheels can detect. The frequency of the modulation is used to indicate the axle and side the vehicle. In another embodiment, different modulation frequencies can be transmitted at different power levels to provide indication of inner versus outer wheel positions.

It will be appreciated that although the systems and methods herein are described with regard to low frequency initiator coils as modulated signal sources, other signal sources are contemplated. For example, the sensors can be programmed to detect ultrasonic signals modulated by a modulation frequency, and to determine their position as a function of a correlation between a detected modulation frequency and a particular wheel end and axle. In another example, the sensors can be programmed to detect infrared signals modulated by a modulation frequency, and to determine their position as a function of a correlation between a detected modulation frequency and a particular wheel end and axle. In another embodiment, magnetic induction signals are transmitted and detected by the sensors to determine sensor position. In yet another embodiment, radio frequency (RF) signals are transmitted and detected by the sensors to determine sensor position.

Figure 2:
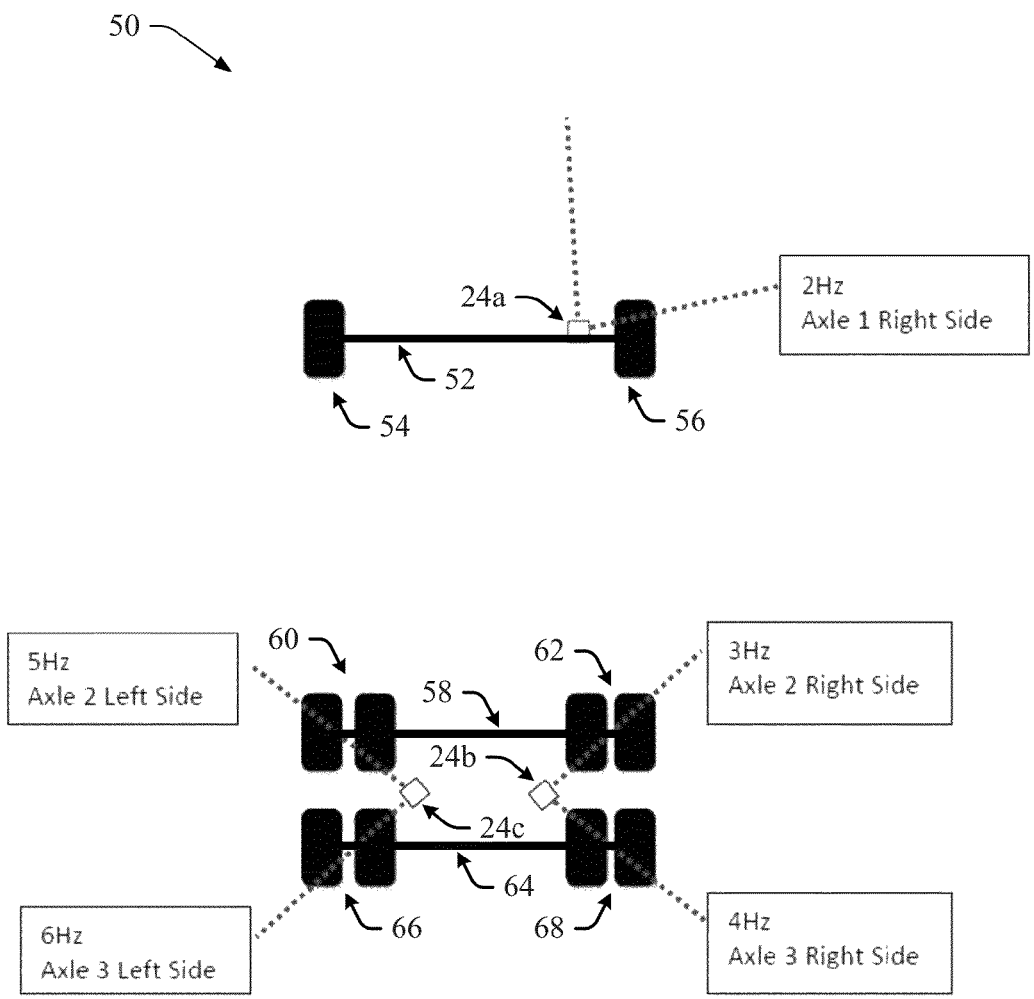
FIG. 2 illustrates a framework for automatically identifying the location of each TPMS sensor on a multi-axle vehicle, in accordance with one or more aspects described herein.

FIG. 2 illustrates a framework 50 for automatically identifying the location of each TPMS sensor on a multi-axle vehicle, in accordance with one or more aspects described herein. The framework comprises a front axle 52 having respective wheel ends 54, 56, a mid-axle 58 having respective wheel ends 60, 62, and a rear axle 64 having respective wheel ends 66, 68. It will be appreciated that although the herein-described embodiments and examples are described with regard to, e.g., a three-axle vehicle, the described system and methods are applicable vehicles having any number of axles.

A first initiator coil transmitter 24*a* is positioned on or near the front axle 52 and emits a low frequency modulated signal (e.g., a 125 kHz signal modulated by 2 Hz or some other predetermined modulation frequency) that is received by TPS1, for example (FIG. 1). A second initiator coil 24*b* is positioned between the mid-axle 58 and the rear axle 64 on or toward a first side (e.g., a starboard side) of the vehicle, and a third initiator coil 24*c* is positioned between the mid-axle 58 and the rear axle 64 on or toward a second side (e.g., a port side) of the vehicle. The second initiator coil 24*b* emits a first low frequency modulated signal (e.g., modulated by 3 Hz or the like) from a first directional antenna (FIG. 1) toward the mid-axle wheel end on the first side (e.g., starboard side) of the vehicle, and emits a second low frequency modulated signal (e.g., modulated by 4 Hz or the like) from a second directional antenna (FIG. 1) toward the rear-axle wheel end on the first side (e.g., starboard side) of the vehicle. Similarly, the third initiator coil 24*c* emits a first low frequency modulated signal (e.g., modulated by 5 Hz or the like) from a first directional antenna (FIG. 1) toward the mid-axle wheel end on the second side (e.g., port side) of the vehicle, and emits a second low frequency modulated signal (e.g., modulated by 6 Hz or the like) from a second directional antenna (FIG. 1) toward the rear-axle wheel end on the second side (e.g., port side) of the vehicle.

In one embodiment, a given sensor receives a low frequency-modulated signal from a respective initiator coil antenna and performs a table lookup to determine its axle and wheel end position based on the frequency modulation. For instance, a tire pressure sensor that receives a 5 Hz signal accesses a pre-programmed lookup table (e.g., downloaded or installed on the sensor) to determine that the 5 Hz modulation frequency signal is aimed at or directed toward the driver (left) side wheel end of the mid-axle (in the instant example), and therefore concludes that it is mounted in or on a wheel on the port side of the mid axle. When transmitting tire pressure status information to the controller, the sensor incorporates its position or location information into the signal message. A sensor that does not include modulation frequency information in its tire pressure status message is presumed to be the forward left (driver side) wheel.

Figure 3:
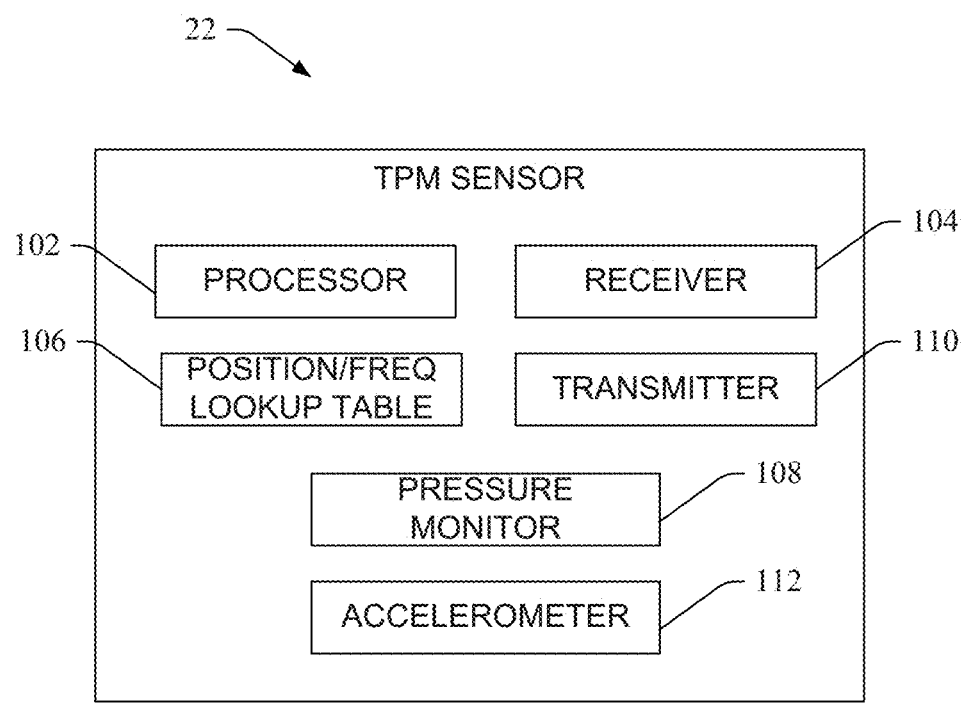
FIG. 3 illustrates a tire pressure sensor that automatically detects its own position on a vehicle, in accordance with one or more aspects described herein.

FIG. 3 illustrates a tire pressure sensor 22 that automatically detects its own position on a vehicle, in accordance with one or more aspects described herein. The sensor comprises a processor 102 configured to analyze an wireless initiator coil signal received by a receiver 104 to detect a modulation frequency by which the initiator coil signal is modulated. Once the modulation frequency is detected, the processor accesses a frequency lookup table 106 that correlates modulation frequencies to axle and wheel end positions. Once the processor has identified the position of its sensor via the lookup table, it generates a tire pressure status message using pressure information detected by a pressure monitor module 108 and incorporates the identified position information into the status message. A transmitter 110 then wirelessly transmits the status message to the controller (FIG. 1).

In one embodiment, the sensor 22 further comprises an accelerometer 112. The processor receives information from the accelerometer regarding the direction of rotation of the wheel in which the sensor is employed. Based on the direction of rotation information, the processor determines whether it is sensing pressure for an inner wheel or an outer wheel on its given wheel end.

Figure 4:
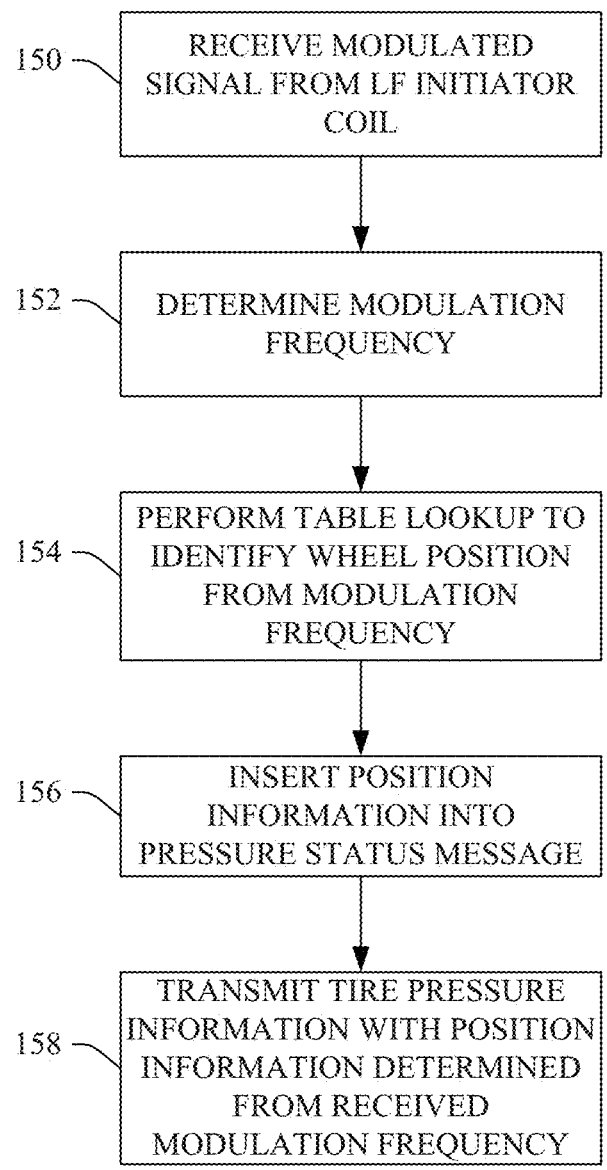
FIG. 4 illustrates a method that facilitates a tire pressure sensor automatically detecting its own position on a vehicle, in accordance with one or more features described herein.

FIG. 4 illustrates a method that facilitates a tire pressure sensor automatically detecting its own position on a vehicle, in accordance with one or more features described herein. At 150, the sensor receives a modulated signal (e.g., a 125 kHz signal modulated at 2 Hz or some other low modulation frequency) from an initiator coil positioned near the sensor At 152, the sensor identifies the modulation frequency by which the initiator coil signal is modulated. At 154, the sensor accesses a stored frequency lookup table that correlates modulation frequencies to axle and wheel end positions. At 156, the sensor generates a tire pressure status message using pressure information detected by a pressure monitor module and incorporates the detected position information into the tire pressure status message. At 158, the status message with incorporated position information is transmitted to an engine control unit.

The innovation has been described with reference to several embodiments. Modifications and alterations may occur to others upon reading and understanding the preceding detailed description. It is intended that the innovation be construed as including all such modifications and alterations insofar as they come within the scope of the appended claims or the equivalents thereof.

Having thus described the preferred embodiments, the invention is now claimed to be:

1. A system that facilitates automatically identifying the location of each of a plurality of tire pressure sensor on a multi-axle vehicle, comprising:
a plurality of low-frequency initiator coils, each having at least one directional antenna;
a plurality of tire pressure sensors, each positioned on a respective wheel of the vehicle;
wherein each antenna emits a signal that is modulated at a different frequency relative to other antennas; and
wherein each sensor detects a modulation frequency received, determines an axle and wheel end at which it is located as function of the detected modulation frequency, and reports its axle and wheel end to a controller unit.

2. The system according to claim 1, wherein each coil has a pair of antennas arranged such that the signals emitted by each antenna are orthogonal to each other.

3. The system according to claim 1, wherein each initiator coil is associated with a single side of the multi-axle vehicle such that frequencies emitted by a given initiator coil indicate the side of the vehicle associated with the initiator coil.

4. The system according to claim 3, wherein the frequencies emitted from the pair of antennas of a given initiator coil are directed toward different axles of the multi-axle vehicle.

5. The system according to claim 2, wherein the frequencies emitted from the pair of antennas of a given initiator coil are directed toward different axles of the multi-axle vehicle.

6. The system according to claim 1, wherein the multi-axle vehicle comprises N axles, where N is an integer, and wherein the system comprises N initiator coils.

7. The system according to claim 6, wherein the signals transmitted by each antenna pair have a frequency that is modulated within a range of 1 Hz to 20 Hz.

8. The system according to claim 1, wherein the sensor also transmits tire pressure information for a tire monitored by the sensor when reporting its axle and wheel end to the controller.

9. The system according to claim 1, wherein the sensor transmits tire pressure information for a tire monitored by the sensor and reports its axle and wheel end to the controller in separate data transmissions.

10. A tire pressure sensor that automatically detects and reports its location to a controller, comprising:
a receiver that receives a modulated frequency signal from a signal source;
a processor configured to determine a modulation frequency used to modulate the frequency signal, and further configured to determine location information describing an axle and wheel end at which the sensor is located as a function of the determined modulation frequency; and
a tire pressure monitor module that monitors air pressure in a tire associated with the sensor;
wherein the processor is further configured to generate a tire pressure status message comprising tire pressure status information and the location information for transmission to a control unit.

11. The sensor according to claim 10, wherein the modulation frequency is in the range of 1 Hz to 20 Hz.

12. The sensor according to claim 10, wherein the modulated signal is a low-frequency initiator coil signal.

13. The sensor according to claim 10, wherein the modulated signal is at least one of an ultrasonic signal, a magnetic induction signal, a radio frequency signal and a low frequency signal.

14. The sensor according claim 10, further comprising an accelerometer, and wherein the processor is further configured to receive from the accelerometer information describing a direction of rotation of a wheel associated with the sensor relative to an outer face of the wheel, to determine whether the wheel is an inner wheel or an outer wheel of the wheel end at which the wheel is located, and to incorporate an indication of whether the wheel is an inner wheel or an outer wheel into the tire pressure status message.

15. A system that facilitates automatically identifying the location of each of a plurality of tire pressure sensor on a multi-axle vehicle, comprising:
a plurality of low-frequency initiator coils, each having at least one directional antenna;
a plurality of tire pressure sensors, each positioned on a respective wheel of the vehicle;
wherein each antenna emits a signal that is modulated at a different frequency relative to other antennas; and
wherein each sensor detects a modulation frequency received and reports the received modulation signal to a controller; and
wherein the controller receives the reported modulation frequency and determines an axle and wheel end at which the sensor is located as function of the reported modulation frequency.

16. The system according to claim 15, wherein the controller receives the reported modulated frequency along with tire pressure information for a tire monitored by the sensor in a single data transmission.

17. The system according to claim 15, wherein the controller receives the reported modulated frequency and tire pressure information for a tire monitored by the sensor in separate data transmissions.

18. A method of automatically detecting and reporting a tire pressure sensor location to a controller, comprising:
   receiving a modulated frequency signal from a signal source;
   determining a modulation frequency used to modulate the received frequency signal;
   determining location information describing an axle and wheel end at which the sensor is located as a function of the determined modulation frequency;
   monitoring air pressure in a tire associated with the sensor; and
   generating a tire pressure status message comprising tire pressure status information and the location information for transmission to a control unit.

19. The method according to claim 18, wherein the modulation frequency is in the range of 1 Hz to 20 Hz.

20. The method according to claim 18, wherein the modulated signal is a low-frequency initiator coil signal.

21. The method according to claim 18, wherein the modulated signal is an ultrasonic signal.

22. The method according to claim 18, wherein the modulated signal is radio frequency (RF) signal.

23. The method according claim 18, further receiving from an accelerometer information describing a direction of rotation of a wheel associated with the sensor relative to an outer face of the wheel, determining whether the wheel is an inner wheel or an outer wheel of the wheel end at which the wheel is located, and incorporating an indication of whether the wheel is an inner wheel or an outer wheel into the tire pressure status message.

24. An apparatus that facilitates automatically detecting and reporting a tire pressure sensor location to a controller, comprising:
   receiving means for receiving a modulated frequency signal from a signal source;
   monitoring means for monitoring air pressure in a tire associated with the sensor;
   processing means for:
   determining a modulation frequency used to modulate the received frequency signal;
   determining location information describing an axle and wheel end at which the sensor is located as a function of the determined modulation frequency; and
   generating a tire pressure status message comprising tire pressure status information and the location information for transmission to a control unit.

* * * * *